United States Patent
Fiolek et al.

(10) Patent No.: US 9,188,259 B2
(45) Date of Patent: Nov. 17, 2015

(54) REDUCED PRESSURE-DROP PIPE ELEMENT

(75) Inventors: Michel Fiolek, Conches en Ouche (FR); Mikaël Deschamps, Fontaine Bellenger (FR)

(73) Assignee: SNECMA, Paris (FR)

(*) Notice: Subject to any disclaimer, the term of this patent is extended or adjusted under 35 U.S.C. 154(b) by 0 days.

(21) Appl. No.: 13/984,615

(22) PCT Filed: Feb. 8, 2012

(86) PCT No.: PCT/FR2012/050268
§ 371 (c)(1),
(2), (4) Date: Dec. 9, 2013

(87) PCT Pub. No.: WO2012/107687
PCT Pub. Date: Aug. 16, 2012

(65) Prior Publication Data
US 2014/0144540 A1    May 29, 2014

(30) Foreign Application Priority Data

Feb. 11, 2011 (FR) ................................. 11 51117

(51) Int. Cl.
| | |
|---|---|
| F16L 11/18 | (2006.01) |
| F02K 1/82 | (2006.01) |
| F16L 51/02 | (2006.01) |
| F16L 57/04 | (2006.01) |
| F16L 57/06 | (2006.01) |

(52) U.S. Cl.
CPC . F16L 11/18 (2013.01); F02K 1/82 (2013.01); F16L 51/028 (2013.01); F16L 57/04 (2013.01); F16L 57/06 (2013.01)

(58) Field of Classification Search
USPC .......................... 138/109, 120, 121, 155, 173
See application file for complete search history.

(56) References Cited

U.S. PATENT DOCUMENTS

| | | | |
|---|---|---|---|
| 1,505,121 A | | 8/1924 | Allport |
| 2,822,194 A | * | 2/1958 | Fentress ......................... 285/299 |
| 2,893,431 A | * | 7/1959 | Bowditch ........................... 92/42 |
| 3,381,361 A | * | 5/1968 | Lecluse et al. .................. 29/423 |

(Continued)

FOREIGN PATENT DOCUMENTS

| | | |
|---|---|---|
| DE | 34 05 924 | 7/1984 |
| GB | 1 531 792 | 11/1978 |

OTHER PUBLICATIONS

International Search Report Issued Apr. 5, 2012 in PCT/FR12/050268 Filed Feb. 8, 2012.

*Primary Examiner* — Paul R Durand
*Assistant Examiner* — Vishal Pancholi
(74) *Attorney, Agent, or Firm* — Oblon, McClelland, Maier & Neustadt, L.L.P.

(57) ABSTRACT

A duct element configured to be used as a shapeable coupling element in a fluid flow line in any industrial application, for example within a rocket engine. The duct element includes a deformable tubular covering in a form of a bellows including inwardly projecting annular projections; and a protective sleeve including an end segment fastened in the tubular covering and including a free end that projects towards an inside of the tubular covering. The protective sleeve includes a plurality of other segments engaged in part one within another, each of the other segments including at a periphery of an outside surface thereof at least one attachment element fastened to the outside surface and that co-operates with at least one annular projection.

12 Claims, 2 Drawing Sheets

(56) References Cited

U.S. PATENT DOCUMENTS

| | | | |
|---|---|---|---|
| 4,415,185 A * | 11/1983 | Vinciguerra et al. | 285/114 |
| 4,911,206 A * | 3/1990 | Gropp et al. | 138/110 |
| 5,660,419 A * | 8/1997 | Kim | 285/226 |
| 5,983,738 A * | 11/1999 | Delaisse | 74/18.1 |
| 6,230,748 B1 * | 5/2001 | Krawietz et al. | 138/121 |
| 6,282,887 B1 | 9/2001 | Polushin et al. | |
| 6,848,478 B2 * | 2/2005 | Nagai | 138/112 |
| 7,264,280 B2 * | 9/2007 | Kim | 285/226 |
| 2008/0041482 A1 * | 2/2008 | Baumhoff et al. | 138/121 |

* cited by examiner

REDUCED PRESSURE-DROP PIPE ELEMENT

BACKGROUND OF THE INVENTION

1. Field of the Invention

The present invention relates to a duct element suitable for use as a shapeable coupling element in any line for passing a flow of fluid, a gas or a liquid, within any industrial application, e.g. within a rocket engine.

2. Description of the Related Art

Duct elements of this type are known that comprise a deformable tubular covering in the form of a bellows having inwardly projecting annular projections, thereby making it easy for said bellows to couple together two rigid pipes of the flow line, even with the pipes that do not share a common axis.

Inside the flow line, the fluids may be conveyed at speeds that are high and/or at temperatures that are extreme, whether cryogenic or very high.

The duct element is in particular confronted with such constraints if it is intended, for example, to be applied to a fluid flow line that is mounted within a rocket engine, in particular for admitting fuels and oxidizers to a combustion chamber of such an engine.

In order to protect the tubular covering of such a prior art duct element against the damage that results from the effects of turbulence and/or large thermal effects, one solution in widespread use consists in causing the fluid to flow not directly within the tubular covering itself, but within a protective sleeve having an end segment that is fastened in one end of the tubular covering and having its free end projecting into the inside of the tubular covering.

In a variant of that prior art protective sleeve, a second segment projects into the inside of the tubular covering, with one of its ends being partially engaged on the free end of said end segment.

Because of the dynamic behavior of the duct element, a drawback of both of those prior art variants lies in the need for the protective sleeve to include a constriction in its flow section, which constriction increases with decreasing radius of curvature to be imparted to the duct element in order to shape it in position.

Although the two-segment variant makes it possible for the flow section to be constricted to a lesser extent than when using a single section, the constriction present on the fluid flow path in both variants gives rise to head losses on the fluid flow line that are too great.

In addition, it has been found that the ends of the segments of the protective sleeve become degraded as a result of stresses from the vibration induced by constricting the flow of the fluid.

BRIEF SUMMARY OF THE INVENTION

An object of the present invention is to remedy those problems by providing a duct element that makes it possible practically to eliminate the constriction of the flow section of the protective sleeve.

More particularly, this object of the invention is achieved by a duct element that comprises a deformable tubular covering in the form of a bellows having inwardly projecting annular projections; and a protective sleeve comprising an end segment fastened in the tubular covering and having a free end that projects towards the inside of the tubular covering, the invention being characterized in that the protective sleeve further comprises a plurality of other segments engaged in part one within another, each of said other segments including at a periphery of an outside surface thereof at least one attachment element that is fastened to said outside surface and that co-operates with at least one annular projection.

It can be understood that by increasing the number of segments included in the protective sleeve, it is possible to minimize the constriction of the flow section to a strict minimum and consequently practically to eliminate turbulence in the flow of fluid passing through the duct element.

More precisely, by engaging the segments of the protective sleeve partially one within another, and by causing each of those segments to co-operate with at least one annular projection of the tubular covering via at least one attachment element situated on a periphery of an outside surface, a protective sleeve is obtained that fits much more closely to the shape of the tubular covering, regardless of its curvature.

Furthermore, said at least one attachment element included on each other segment may be an additional element that is fastened on the segment (i.e. an element that is initially separate from the segment and that is subsequently attached thereto), and in particular that is fastened on the outside surface of the segment.

Advantageously, the attachment element may be fastened to the outside surface by welding.

Advantageously, each of said other segments of the protective sleeve includes a plurality of attachment elements, at substantially regular intervals on the periphery of an outside surface, and preferably has at least three attachment elements, or even six as in the examples shown below. This does not therefore mean that having recourse to segments having only one attachment element would be unsatisfactory, since such a configuration nevertheless makes it possible to position the segments accurately within the tubular covering, and can even be advantageous in a duct element of small dimensions.

According to another preferred characteristic of the invention, such another segment of the protective sleeve comprises a band of metal strip rolled up with partial overlap, thereby defining the outside surface of said other segment, which surface has at least one attachment element mounted on its periphery.

It can be understood that according to this preferred characteristic of the invention, the segment of the protective sleeve thus possesses a certain amount of resilience enabling it both to remain rolled up with partial overlap like a spiral spring, and also making it easy for it to be engaged in part in another segment. Furthermore, the small thickness of the metal sheet contributes to increasing the flow section and allows the weight of the protective sleeve to be optimized.

In a preferred embodiment, an attachment element of a segment is in the form of a tab that engages against at least one annular projection, the profile of the tab advantageously being generally U-shaped, in particular a U-shape with diverging branches.

Advantageously, an attachment element of a segment co-operates with only one annular projection of the tubular covering.

This solution makes it possible to use segments of short length, such that the protective sleeve fits even better against the shape of the tubular covering, thereby enabling the duct element to be curved even more easily and ensuring that the constriction of the flow passage is practically non-existent. This preferred solution nevertheless does not prevent making one attachment element co-operate with a plurality of annular projections. Such a configuration may be found to be particularly appropriate when it is desired specifically to reinforce locally the stiffness of the duct element in order to limit the extent to which it can be curved.

Advantageously, but not necessarily, the duct element of the present invention is suitable for being fitted with external reinforcement.

It can be understood that it is thus possible to reinforce the tubular covering by stiffening it to a greater extent by means of external reinforcement, and this can be particularly advantageous when the pressure of the fluid conveyed in the duct element is high.

The duct element then preferably has a plurality of rigid reinforcing rings, each having a respective annular projection that projects inwards and that is suitable for engaging in the outside of an annular projection of the tubular covering.

The end segment of the protective sleeve is preferably fastened in the tubular covering by welding.

In a preferred embodiment, the end segment is fastened to the tubular covering at a fluid inlet end thereof.

It can be understood that in this preferred embodiment, vibration stresses at the inlet of the protective sleeve due to the flow of the fluid are reduced to a very great extent.

BRIEF DESCRIPTION OF THE SEVERAL VIEWS OF THE DRAWINGS

Other characteristics and advantages of the invention appear better on reading the following description of an embodiment of the invention given by way of non-limiting example. The description refers to the accompanying drawings, in which.

DETAILED DESCRIPTION OF THE INVENTION

Figure 1:
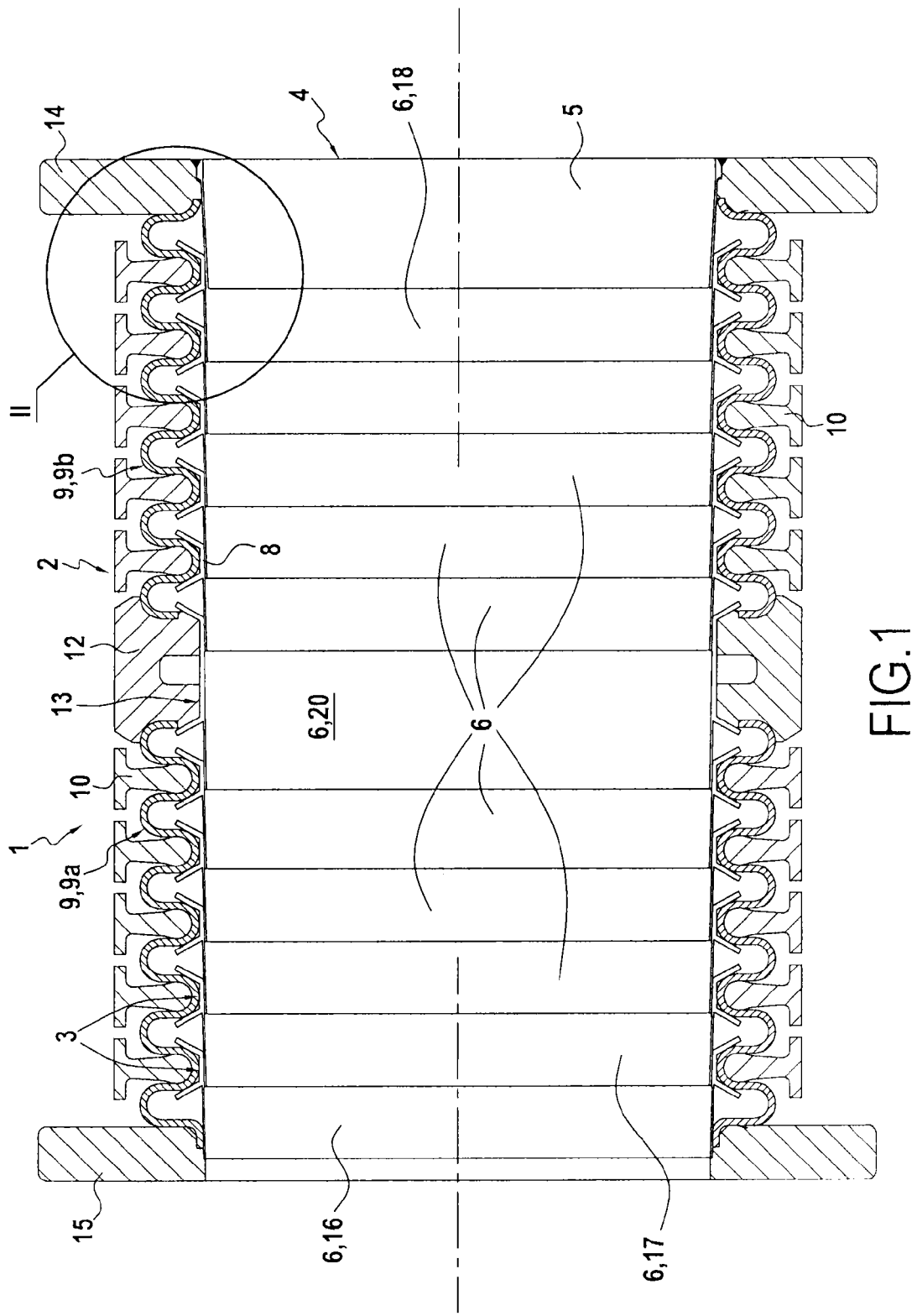
FIG. 1 is a longitudinal section view of a duct element in accordance with the invention.

There follows a description of the general organization of the duct element in accordance with the invention.

The duct element 1 (cf. FIG. 1) has a deformable tubular covering 2 in the form of a bellows with annular projections 3 that project inwards.

The bellows of the tubular covering 2 comprises a metal sealing sheath 9, preferably made of stainless steel. The sealing sheath 9 may be made either as a single piece (cf. FIG. 2), or else from two or more sheets 18 and 19 that are shaped together (cf. FIG. 4).

Furthermore, and if necessary when the pressure that exists inside the tubular covering 2 lies in the range a few bars to a few hundred bars, it is possible to mount rigid reinforcing rings 10 on the sealing sheaths 9. Such reinforcing rings 10 are advantageously made of metal, preferably of steel, and each of them comprises a respective annular projection 11 projecting inwards and of profile that is designed to be suitable for engaging against the outside of the annular projection 3.

Figure 2:
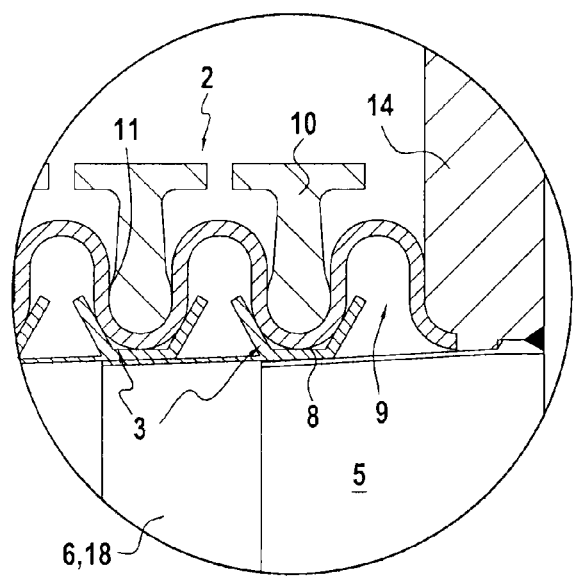
FIG. 2 is a view in longitudinal section of the detail II of FIG. 1 of a duct element in accordance with the invention.
Figure 4:
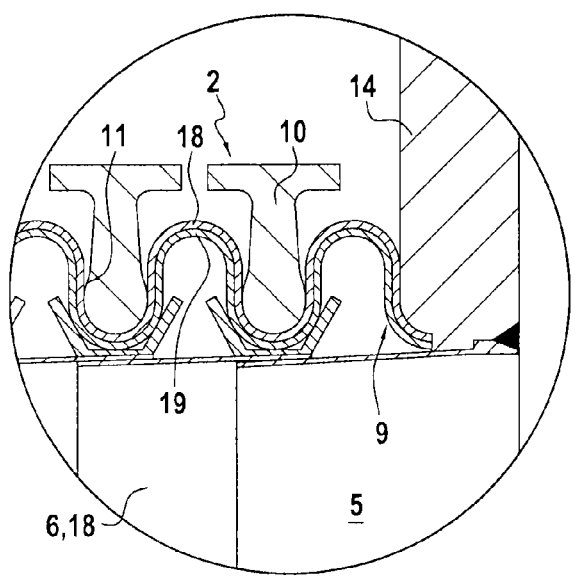
FIG. 4 is a longitudinal section view of the detail II of FIG. 1 of the duct element in accordance with the invention and showing up a particular way of making the tubular covering.

The profile of the annular projection 11 of a reinforcing ring 10 may have flanks that are parallel, but it is preferably in the shape of a drop of water (cf. FIGS. 2 and 4). An annular projection 11 having a profile in the shape of a drop of water enables the reinforcing ring 10 engaged in the annular projection 3 of the sealing sheath 9 to avoid opposing curving of the tubular covering 2.

Furthermore, in order to enable the annular projection 11 of a reinforcing ring 10 to engage in an annular projection 3 of the sealing sheath 9 from the outside, each reinforcing ring 10 is advantageously made up of two portions.

The tubular covering 2 may include a rigid central ring 12 that is made of metal, preferably of steel, in order to better distribute the stresses to which the tubular covering 2 is subjected when being curved. The sealing sheath 9 is then subdivided into two portions 9a and 9b that are arranged on either side of the central ring 12, one end of each of the two portions 9a and 9b as formed in this way being engaged at one end in the central ring 12.

The rigid central ring 12 presents an annular projection 13 that projects inwards, as shown in FIG. 1. This annular projection 13 includes an internal groove for optimizing the weight of the central ring 12.

The duct element 1 also includes a protective sleeve 4 having an end segment 5 fastened in an inlet flange 14 of the tubular covering 2 and having a free end that projects towards the inside of the tubular covering 2.

The end segment 5 is fastened in the inlet flange 14 of the tubular covering 2, preferably by welding.

In accordance with the invention, the protective sleeve 4 of the duct element 1 has a plurality of other segments 6 that are engaged partially one on another.

Figure 3:
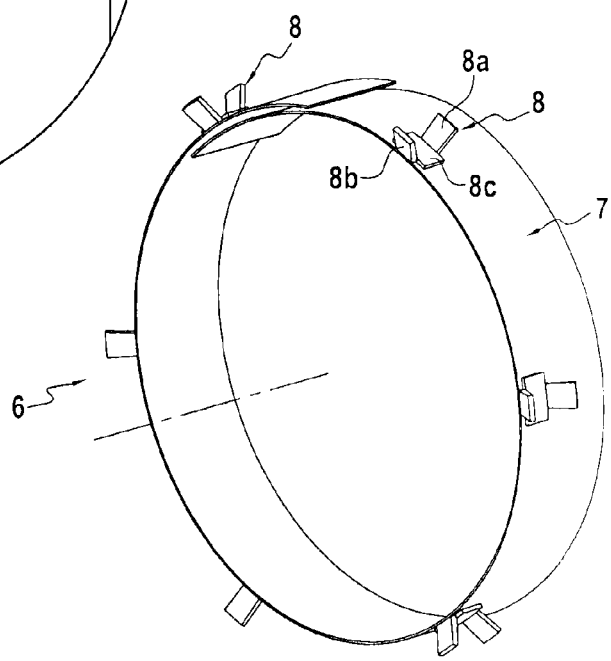
FIG. 3 is a perspective view of a segment of the protective sleeve in accordance with the invention.

Such a segment 6 is in the form of a band made of metal strip that is rolled up with partial overlap (cf. FIG. 3). The length of the band of metal strip corresponds to a little more than the length of an annular projection 3, such that once the segment 6 has been installed inside the tubular covering 2 it can engage partially inside the adjacent segment.

In the example shown, such a segment 6 has a plurality of attachment elements 8 fastened to said segment 6, preferably by welding.

More particularly, the segment 6 has six attachment elements 8 arranged at substantially regular intervals at the periphery of its outside surface 7, such that all of the attachment elements 8 engage on the same annular projection 3 of the tubular covering 2. The attachment elements 8 thus enable the segments 6 to be held in predetermined positions inside the tubular covering 2.

Such an attachment element 8 is constituted by a rectangular metal plate, preferably made of the same metal as that used for making a segment 6, with its two ends 8a and 8b being folded in a lateral direction relative to the segment 6 with a fold angle of less than 90°. The base 8c of the attachment element 8 is fastened, preferably by welding, in an eccentric position on the periphery of the outside surface 7 of a segment 6. The article as folded in this way forms a tab of generally U-shaped profile with diverging branches. This shape makes it easy to engage the attachment element 8 on the annular projection 3 since the folded walls 8a and 8b provide a guidance function on insertion. In addition, this shape has the advantage of minimizing points of contact at the interface between the attachment element 8 and the annular projection 3, such that it is easier for the segment 6 to rock a little relative to an annular projection.

As shown in the example, it may be advantageous to shorten the length of the folded walls 8a and 8b while conserving the dimensions of the base 8c intact, in order to make it easier to apply weld spots when fastening the attachment element 8 to the outside surface 7.

When the presence of a central ring 12 is required, the attachment elements 8 of a central segment 20 positioned level with the rigid central ring 12 are engaged directly on the annular projection 13 of the central ring 12 (cf. FIG. 1). Thus, since the length of the projection 13 depends on the length of the rigid central ring 12, the dimensions of the attachment elements 8 of said central segment 20 are adapted accordingly, and the length of the central segment 20 is also adapted so that it remains longer than the length of the rigid central ring 12, so that there is no interruption in the continuity of the assembly constituting the protective sleeve 4.

There follows a description of one way of assembling a duct element 1 constituting the embodiment of the invention as described above.

The first step consists in mounting a first segment 16 in the tubular covering 2 by engaging its attachment elements 8 on the first annular projection 3 encountered beside an outlet flange 15. To do this, the first segment 16 is pinched between two points on its outside surface 7, between the attachment elements 8, e.g. by means of a suitable pincer, thereby having the effect, by elasticity, of increasing the length of the overlap portion of the first segment 16, so that its diameter decreases. It is then possible to insert the first segment 16 into the tubular covering 2 by passing it through the outlet flange 15. On relaxing the pressure exerted on the first segment 16, it returns elastically to its initial diameter, thereby holding it in position in the tubular covering 2.

Thereafter, a second segment 17 is pinched so as to reduce its diameter elastically, and is then positioned on the second annular projection 3 to be encountered starting from the outlet flange 15, by passing the second segment 17 through the outlet flange 15 and then inside the first segment 16 within the tubular covering 2. Since the length of the segments 6 is longer than the length of the annular projections 3, and since the attachment elements 8 are fastened in eccentric manner on the peripheries of their outside surfaces 7, once the stress exerted by pinching the second segment 17 has been released, the second segment returns to a state in which it is partially engaged in the first segment 16.

It then suffices to employ exactly the same technique for mounting the following segments 6.

Once all of the segments 6 have been mounted, the last segment 18 has one end that remains free beside the inlet flange 14. The end segment 5, which is not necessarily extensible like the other segments 6, is then inserted into the tubular covering 2 by passing through the inlet flange 14. The end segment 5 is pushed into the tubular covering 2 until it is partially engaged within the end that has remained free of the last segment 18. Once in position, the end segment 5 is finally welded to the inside of the inlet flange 14.

The invention claimed is:

1. A duct element comprising:
   a deformable tubular covering in a form of a bellows including inwardly projecting annular projections; and
   a protective sleeve including an end segment fastened in the tubular covering and including a free end that projects towards an inside of the tubular covering,
   wherein the protective sleeve further includes a plurality of other segments engaged in part one within another, each of the other segments including at a periphery of an outside surface thereof at least one attachment element that is fastened to the outside surface, that co-operates with at least one annular projection, and that enables the segment to rock relative to the at least one annular projection,
   wherein the bellows of the tubular covering include a sealing sheath,
   wherein the tubular covering includes a central ring presenting an annular projection that projects inwards,
   wherein the sealing sheath is subdivided into first and second portions which are arranged on either side of the central ring, and first ends of the first and second portions of the sealing sheath are engaged with ends of the central ring, and
   wherein the annular projection of the central ring engages the attachment element of a central segment, a length of the central segment being longer than a length of the central ring.

2. A duct element according to claim 1, wherein each of the other segments includes a band of metal strip rolled up with partial overlap and defining the outside surface.

3. A duct element according to claim 1, wherein the attachment element is in a form of a tab that engages against at least one annular projection.

4. A duct element according to claim 3, wherein a profile of the tab is generally U-shaped, or is U-shape with diverging branches.

5. A duct element according to claim 1, wherein the attachment element co-operates with only one annular projection.

6. A duct element according to claim 1, wherein each of the other segments includes a plurality of attachment elements, or at least three attachment elements.

7. A duct element according to claim 1, wherein an end segment is fastened in the tubular covering by welding.

8. A duct element according to claim 1, wherein an end segment is fastened to the tubular covering at a fluid inlet end thereof.

9. A duct element according to claim 1, wherein the attachment element is fastened to the outside surface by welding.

10. A duct element according to claim 1, wherein the sealing sheath is made of a single piece.

11. A duct element according to claim 1, wherein the sealing sheath is made of two or more sheets that are shaped together.

12. A duct element according to claim 1, further comprising a reinforcing ring mounted on the sealing sheath, the reinforcing ring including an annular projection projecting inwards and engaging an outside of the annular projection of the bellows.

* * * * *